US012790233B2

(12) United States Patent
Cheng et al.

(10) Patent No.: US 12,790,233 B2

(45) Date of Patent: Nov. 10, 2026

(54) METAL HYDROXIDE, POSITIVE ELECTRODE MATERIAL, ELECTROCHEMICAL DEVICE, AND ELECTRICAL DEVICE

(71) Applicant: Ningde Amperex Technology Limited, Ningde City (CN)

(72) Inventors: Shiyang Cheng, Ningde City (CN); Jumpei Shitaba, Ningde City (CN); Ye Lang, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 314 days.

(21) Appl. No.: 18/622,079

(22) Filed: Mar. 29, 2024

(65) Prior Publication Data

US 2024/0239690 A1 Jul. 18, 2024

Related U.S. Application Data

(63) Continuation of application No. PCT/CN2022/112504, filed on Aug. 15, 2022.

(51) Int. Cl.

*C01G 53/506* (2025.01)
*C01G 53/05* (2025.01)

(Continued)

(52) U.S. Cl.

CPC ........... *C01G 53/506* (2025.01); *C01G 53/05* (2025.01); *C01G 53/40* (2013.01); *C01G 53/504* (2025.01);

(Continued)

(58) Field of Classification Search

CPC .. C01G 53/42; H01M 2004/028; H01M 4/36; H01M 10/0525; Y02E 60/10

See application file for complete search history.

(56) References Cited

U.S. PATENT DOCUMENTS

| | | | | |
|---|---|---|---|---|
| 2018/0331361 | A1* | 11/2018 | Nelson | C01G 53/04 |
| 2020/0035991 | A1 | 1/2020 | Wang et al. | |
| 2021/0218021 | A1 | 7/2021 | Kim et al. | |

FOREIGN PATENT DOCUMENTS

| | | |
|---|---|---|
| CN | 105428639 A | 3/2016 |
| CN | 107732212 A | 2/2018 |

(Continued)

OTHER PUBLICATIONS

International Serach Report dated Mar. 22, 2023, issued in parent International Application No. PCT/CN2022/112504 (4 pages).

(Continued)

*Primary Examiner* — Khanh T Nguyen

(74) *Attorney, Agent, or Firm* — WHDA, LLP

(57) ABSTRACT

A metal hydroxide includes Ni element. An axial lattice constant c Å of the metal hydroxide satisfies: $0.363x+4.2 \le c \le 0.363x+4.4$, where, based on a total molar mass of a metal element in the metal hydroxide, a molar percentage of the Ni element in the metal hydroxide is x. The lattice constant c of the metal hydroxide falls within a specified value range. The positive electrode material prepared from the metal hydroxide serving as a precursor is of excellent structural stability in a charging and discharging environment, and improves the cycle performance, high-temperature performance, and safety performance of lithium-ion batteries.

15 Claims, 1 Drawing Sheet

Embodiment

Comparative Embodiment

(51) Int. Cl.

| | |
|---|---|
| ***C01G 53/40*** | (2025.01) |
| ***C01G 53/504*** | (2025.01) |
| ***C01G 53/68*** | (2025.01) |
| ***C01G 53/84*** | (2025.01) |
| ***H01M 4/525*** | (2010.01) |

(52) U.S. Cl.

CPC ............. *C01G 53/68* (2013.01); *C01G 53/84* (2025.01); *H01M 4/525* (2013.01); *C01P 2002/52* (2013.01); *C01P 2002/74* (2013.01); *C01P 2002/82* (2013.01); *C01P 2004/03* (2013.01); *C01P 2004/61* (2013.01); *C01P 2006/40* (2013.01)

(56) References Cited

FOREIGN PATENT DOCUMENTS

| | | | | |
|---|---|---|---|---|
| CN | 109004198 A | | 12/2018 | |
| EP | 3817105 A1 | | 5/2021 | |
| JP | 2002-298839 A | | 10/2002 | |
| WO | WO 2021062095 | * | 4/2021 | ............ H01M 10/26 |
| WO | 2022/080710 A1 | | 4/2022 | |

OTHER PUBLICATIONS

Lian Fang, "Battery Energy Storage Technology", Electrochemical Energy Storage Devices and Key Materials, Jul. 31, 2019 (Jul. 31, 2019), 1, 10-113.3.3 Cathode material-nickel hydroxide. Cited in ISR.

Fang, L. "Battery Energy Storage Technology" Electrochemical Energy Storage Devices and Key Materials, Jul. 31, 2019, with English translation. (4 pages); cited in ISR.

Extended (Supplementary) European Search Report dated Sep. 8, 2025, issued in counterpart EP Application No. 22955219.5. (7 pages).

Zhang, W. et al., Effect of nickel hydroxide composition on the electrochemical performance of spherical Ni(OH)2 positive materials for Ni—MH batteries, International Journal of Hydrogen Energy, ScienceDirect, vol. 34, pp. 473-480, 2009. (8 pages); cited in Extended European Search Report dated Sep. 8, 2025.

Kosova, N. et al., Mixed layered Ni—Mn—Co hydroxides: Crystal structure, electronic state of ions, and thermal decomposition, Journal of Power Sources, ScienceDirect, vol. 174, pp. 735-740, 2007. (6 pages); cited in Extended European Search Report dated Sep. 8, 2025.

* cited by examiner

Embodiment
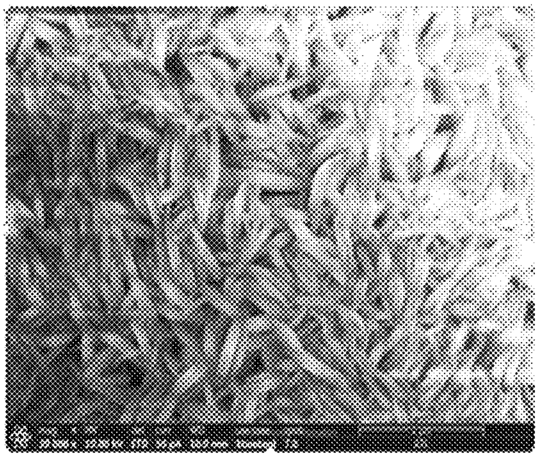
Comparative Embodiment
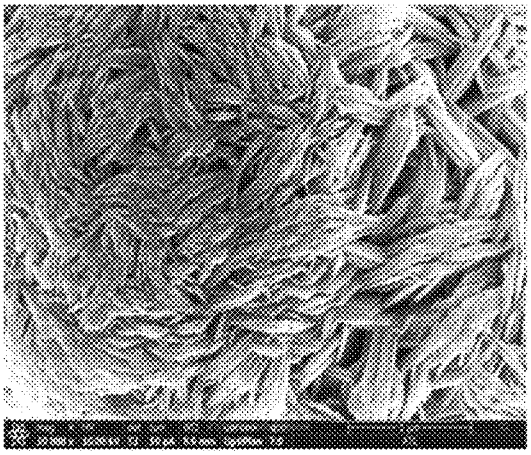

METAL HYDROXIDE, POSITIVE ELECTRODE MATERIAL, ELECTROCHEMICAL DEVICE, AND ELECTRICAL DEVICE

CROSS REFERENCE TO RELATED APPLICATIONS

This application is a continuation application of International Application No. PCT/CN2022/112504, filed on Aug. 15, 2022, the contents of which are incorporated herein by reference in its entirety.

TECHNICAL FIELD

This application relates to the technical field of batteries, and in particular, to a metal hydroxide, a positive electrode material, an electrochemical device, and an electrical device.

BACKGROUND

With the popularization of products such as notebook computers, mobile phones, handheld game consoles, tablet computers, and electric vehicles, people are imposing higher requirements on a battery in the products. Lithium-ion batteries are widely used by virtue of advantages such as a high energy storage density, a high power density, high safety, environmental friendliness, a long service life, a low self-discharge rate, and adaptability to a wide range of temperatures. To increase the energy density of the lithium-ion batteries, positive electrode materials have been developing toward a higher working voltage and a higher delithiation percentage. However, with the increase of the working voltage and the delithiation percentage, a positive electrode material is prone to irreversible phase transition and structural collapse. The irreversible phase transition and structural collapse lead to disruption of a layered structure of the positive electrode material, and are accompanied by side reactions such as gas production.

SUMMARY

In view of the above situation, this application provides a metal hydroxide, a positive electrode material, an electrochemical device, and an electrical device. The positive electrode material prepared from the metal hydroxide is of excellent structural stability, and can improve the cycle performance, high-temperature performance, and safety performance of the electrochemical device.

According to a first aspect of this application, a metal hydroxide is provided. The metal hydroxide includes Ni element. An axial lattice constant c Å of the metal hydroxide satisfies: $0.363x+4.2 \leq c \leq 0.363x+4.4$, where, based on a total molar mass of a metal element in the metal hydroxide, a molar percentage of the Ni element in the metal hydroxide is x. The controlling the axial lattice constant c of the metal hydroxide to fall within the above range brings two beneficial effects. One beneficial effect is that this application facilitates intercalation of lithium ions during preparation of the positive electrode material, reduces the content of residual lithium on the surface of the positive electrode material, and in turn, reduces occurrence of side reactions on the surface, suppresses gas production, and improves safety performance of the electrochemical device. The other beneficial effect is that this application improves structural stability of the prepared positive electrode material, and suppresses irreversible phase transition and structural collapse of the positive electrode material in a high-delithiation state, thereby improving the cycle performance and high-temperature performance of the electrochemical device.

In some embodiments, a c/a ratio of the axial lattice constant c Å to an in-plane lattice constant a Å of the metal hydroxide satisfies: $1.48 \leq c/a \leq 1.50$. The c/a ratio is an indicator used to represent orderliness of a hexagonal crystal system. When the c/a ratio falls within the above range, on the one hand, the relatively high c/a ratio enhances the intercalation capability of the metal hydroxide in a c-axis direction, and in turn, reduces the content of residual lithium on the surface of the positive electrode material, reduces the occurrence of side reactions on the surface, suppresses gas production, and improves safety performance of the electrochemical device. On the other hand, the high orderliness of the layered metal hydroxide and the reduced lattice stacking fault defects can suppress structural distortion caused by structural slippage of the prepared positive electrode material, thereby enhancing structural stability of the positive electrode material and improving the cycle performance and high-temperature performance of the electrochemical device.

In some embodiments, a peak intensity in a range of 500 $cm^{-1}$ to 530 $cm^{-1}$ in a Raman spectrum of the metal hydroxide is $I_1$, and a peak intensity in a range of 3550 $cm^{-1}$ to 3610 $cm^{-1}$ is $I_2$, satisfying: $-4.32x+4 \leq I_1/I_2 \leq -4.32x+6$. The $I_1/I_2$ ratio may be used to represent the degree of stacking faults in a layered metal hydroxide precursor. On the one hand, the $I_1/I_2$ being less than or equal to $-4.32x+6$ can suppress structural distortion after lithiation, and improve the structural stability of the positive electrode material, and in turn, improve the cycle performance and high-temperature performance of the electrochemical device. On the other hand, $I_1/I_2$ being greater than or equal to $-4.32x+4$ can improve lithiation activity, reduce the content of residual lithium on the surface, reduce the occurrence of side reactions on the surface, suppress gas production, and in turn, improve the safety performance of the electrochemical device.

In some embodiments, based on the molar mass of the metal element in the metal hydroxide, the molar percentage of the Ni element in the metal hydroxide is greater than or equal to 50%.

In some embodiments, the metal hydroxide further includes Co element. Based on the molar mass of the metal element in the metal hydroxide, a molar percentage of the Co element in the metal hydroxide is less than or equal to 50%.

In some embodiments, the metal hydroxide further includes Mn element. Based on the molar mass of the metal element in the metal hydroxide, a molar percentage of the Mn element in the metal hydroxide is less than or equal to 50%.

In some embodiments, the metal hydroxide further includes an M element. The M element includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr. Based on the molar mass of the metal element in the metal hydroxide, a molar percentage of the M element in the metal hydroxide is less than or equal to 10%.

In some embodiments, the metal hydroxide includes $Ni_xCo_yMn_zM_k(OH)_2$, where, $0.5 \leq x < 1$, $0 \leq y \leq 0.5$, $0 \leq z \leq 0.5$, $0 \leq k \leq 0.1$, and M includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr.

In some embodiments, an average particle size $Dv_{50}$ of the metal hydroxide satisfies: $1\ \mu m \leq Dv_{50} \leq 20\ \mu m$.

In some embodiments, the metal hydroxide includes a secondary particle formed by agglomerating primary particles, and a length-to-diameter ratio of the primary particles is 4 to 14. When the length-to-diameter ratio of the primary particles falls within the above range, the metal hydroxide precursor is of relatively high uniformity, thereby improving the structural stability of the prepared positive electrode material.

According to a second aspect of this application, a positive electrode material is provided. The positive electrode material includes a lithium-nickel composite oxide. An X-ray diffraction spectrum of the positive electrode material includes a first diffraction peak, a second diffraction peak, and a third diffraction peak distributed sequentially from a low angle to a high angle in a range of 34° to 39°, satisfying: 0.25≤(a peak intensity of the second diffraction peak+a peak intensity of the third diffraction peak)/a peak intensity of the first diffraction peak≤0.5. The second diffraction peak is a diffraction peak of the (006) crystal plane of the lithium-nickel composite oxide. The third diffraction peak is a diffraction peak of the (102) crystal plane of the lithium-nickel composite oxide. The first diffraction peak is a diffraction peak of the (101) crystal plane of the lithium-nickel composite oxide. By satisfying the above relationship, this application reduces empty lithium sites and Li/Ni disordering in the positive electrode material, and achieves both orderliness of the layered structure and high activity of lithiation, thereby improving the cycle performance and high-temperature performance of the electrochemical device.

In some embodiments, the X-ray diffraction spectrum of the positive electrode material includes a fourth diffraction peak in a range of 19° to 20° and a fifth diffraction peak in a range of 43° to 46°, satisfying: 1≤a peak intensity of the fourth diffraction peak/a peak intensity of the fifth diffraction peak≤1.5. The fourth diffraction peak is a diffraction peak of the (003) crystal plane of the lithium-nickel composite oxide. The fifth diffraction peak is a diffraction peak of the (104) crystal plane of the lithium-nickel composite oxide. The peak intensity ratio between the fourth diffraction peak and the fifth diffraction peak satisfies the above range, and therefore, both the ionic conductivity and electronical conductivity of the positive electrode material are improved, thereby facilitating exertion of the capacity of the positive electrode material and retention of the capacity during cycling, reducing polarization, and reducing the irreversible capacity of the battery.

In some embodiments, based on a mass of the positive electrode material, a mass percentage of residual lithium on a surface of the positive electrode material is m, satisfying: m≤0.5%.

In some embodiments, based on a molar mass of a metal element except Li in the positive electrode material, a molar percentage of Ni element in the positive electrode material is greater than or equal to 50%.

In some embodiments, the positive electrode material further includes Co element. Based on the molar mass of the metal element except Li in the positive electrode material, a molar percentage of the Co element in the positive electrode material is less than or equal to 50%.

In some embodiments, the positive electrode material further includes Mn element. Based on the molar mass of the metal element except Li in the positive electrode material, a molar percentage of the Mn element in the positive electrode material is less than or equal to 50%.

In some embodiments, the positive electrode material further includes an M element. The M element includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr. Based on the molar mass of the metal element except Li in the positive electrode material, a molar percentage of the M element in the positive electrode material is less than or equal to 10%.

In some embodiments, the positive electrode material includes $Li_mNi_xCo_yMn_zM_kO_{2+b}R_b$, where $0.2\leq m\leq 1.2$, $0.5\leq x<1$, $0\leq y\leq 0.5$, $0\leq z\leq 0.5$, $0\leq k\leq 0.1$, and $0\leq b\leq 0.1$. M includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr. R includes at least one of P, F, or N.

According to a third aspect, an electrochemical device is provided, including a positive electrode. The positive electrode includes the positive electrode material according to the second aspect of this application or a positive electrode material prepared from the metal hydroxide according to the first aspect of this application.

According to a fourth aspect of this application, an electrical device is provided, including the electrochemical device according to the third aspect of this application.

In the technical solutions of this application, the lattice constant c of the metal hydroxide falls within a specified value range. The positive electrode material prepared from the metal hydroxide serving as a precursor is of excellent structural stability in a charging and discharging environment, and improves the cycle performance, high-temperature performance, and safety performance of lithium-ion batteries.

BRIEF DESCRIPTION OF DRAWINGS

To describe the technical solutions in some embodiments of this application more clearly, the following outlines the drawings to be used in the embodiments. Evidently, the drawings outlined below are merely a part of embodiments of this application. A person of ordinary skill in the art may derive other drawings from the outlined drawings without making any creative efforts.

FIGURE shows an SEM image of particles of a metal hydroxide according to this application, with a left part being an SEM image according to Embodiment 1, and a right part being an SEM image according to Comparative Embodiment 1.

DETAILED DESCRIPTION

The following clearly and thoroughly describes the technical solutions in some embodiments of this application with reference to the drawings appended hereto. Evidently, the described embodiments are merely a part of but not all of the embodiments of this application. The embodiments described herein are illustrative in nature, and are intended to enable a basic understanding of this application. No embodiment of this application is to be construed as a limitation on this application.

Unless otherwise specified, the terms used in this application have the well-known meanings commonly understood by a person skilled in the art. Unless otherwise specified, the value of a parameter mentioned in this application may be measured by using a measurement method commonly used in the art (for example, may be tested according to the method described in an embodiment of this application).

A list of items referred to by the terms such as "at least one of", "at least one thereof", "at least one type of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single component or a plurality of components. The item B may include a single component or a plurality of components. The item C may include a single component or a plurality of components.

A discharge gram capacity of a ternary positive electrode material increases with the increase of the working voltage or nickel content. Generally, when the working voltage increases by 0.1 V, the discharge gram capacity increases by approximately 10%. When the nickel content increases by 0.1 mol, the discharge gram capacity increases by approximately 7%. To seek a high energy density, the charging cut-off voltage of the ternary positive electrode material during operation keeps increasing, and has increased from 4.2 V and 4.3 V to 4.4 V. The nickel content also has increased gradually from the initial 0.33 mol to 0.5 mol, 0.6 mol, 0.8 mol, and even over 0.9 mol. However, when the delithiation percentage of the lithium-ion positive electrode material exceeds 80%, irreversible phase transition and structural collapse may occur, resulting in disruption of the layered structure of the material. In addition, the above process is also accompanied by the dissolution of transition metal ions in an electrolytic solution, thereby deteriorating the cycle performance of the lithium-ion battery. In addition, repeated charging and discharging under high-delithiation conditions may cause crushing of the particles of the ternary positive electrode material. The positive electrode material may contact the electrolytic solution and give rise to side reactions to produce gas, thereby impairing the safety performance of the battery.

According to a first aspect of this application, a metal hydroxide is provided. The metal hydroxide includes Ni element. An axial lattice constant c Å of the metal hydroxide satisfies: $0.363x+4.2 \le c \le 0.363x+4.4$. Based on a total molar mass of a metal element in the metal hydroxide, a molar percentage of the Ni element in the metal hydroxide is x.

The metal hydroxide serves as a precursor for preparing the positive electrode material, and the axial lattice constant c of the metal hydroxide exerts a significant effect on the intercalation of lithium ions during the preparation of the positive electrode material and on the structural stability of the prepared positive electrode material. The controlling the axial lattice constant c of the metal hydroxide to fall within the above range brings two beneficial effects. One beneficial effect is that this application facilitates intercalation of lithium ions during preparation of the positive electrode material, reduces the content of residual lithium on the surface of the positive electrode material, and in turn, reduces occurrence of side reactions on the surface, suppresses gas production, and improves safety performance of the electrochemical device. The other beneficial effect is that this application improves structural stability of the prepared positive electrode material, and suppresses irreversible phase transition and structural collapse of the positive electrode material in a high-delithiation state, thereby improving the cycle performance and high-temperature performance of the electrochemical device.

In some embodiments, a c/a ratio of the axial lattice constant c Å to an in-plane lattice constant a Å of the metal hydroxide satisfies: $1.48 \le c/a \le 1.50$. The c/a ratio is an indicator used to represent orderliness of a hexagonal crystal system. When the c/a ratio falls within the above range, on the one hand, the relatively high c/a ratio enhances the intercalation capability of the metal hydroxide in a c-axis direction, and in turn, reduces the content of residual lithium on the surface of the positive electrode material, reduces the occurrence of side reactions on the surface, suppresses gas production, and improves safety performance of the electrochemical device. On the other hand, the high orderliness of the layered metal hydroxide and the reduced lattice stacking fault defects can suppress structural distortion caused by structural slippage of the prepared positive electrode material, thereby enhancing structural stability of the positive electrode material and improving the cycle performance and high-temperature performance of the electrochemical device.

In some embodiments, a peak intensity in a range of 500 $cm^{-1}$ to 530 $cm^{-1}$ in a Raman spectrum of the metal hydroxide is $I_1$, and a peak intensity in a range of 3550 $cm^{-1}$ to 3610 $cm^{-1}$ is $I_2$, satisfying: $-4.32x+4 \le I_1/I_2 \le -4.32x+6$. The $I_1/I_2$ ratio may be used to represent the degree of stacking faults in a layered metal hydroxide precursor. On the one hand, the $I_1/I_2$ being less than or equal to $-4.32x+6$ can suppress structural distortion after lithiation, and improve the structural stability of the positive electrode material, and in turn, improve the cycle performance and high-temperature performance of the electrochemical device. On the other hand, $I_1/I_2$ being greater than or equal to $-4.32x+4$ can improve lithiation activity, reduce the content of residual lithium on the surface, reduce the occurrence of side reactions on the surface, suppress gas production, and in turn, improve the safety performance of the electrochemical device.

In some embodiments, based on the molar mass of the metal element in the metal hydroxide, the molar percentage of the Ni element in the metal hydroxide is greater than or equal to 50%.

In some embodiments, the metal hydroxide further includes Co element. Based on the molar mass of the metal element in the metal hydroxide, a molar percentage of the Co element in the metal hydroxide is less than or equal to 50%.

In some embodiments, the metal hydroxide further includes Mn element. Based on the molar mass of the metal element in the metal hydroxide, a molar percentage of the Mn element in the metal hydroxide is less than or equal to 50%. In some embodiments, the metal hydroxide further includes an M element.

The M element includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr. Based on the molar mass of the metal element in the metal hydroxide, a molar percentage of the M element in the metal hydroxide is less than or equal to 10%.

In some embodiments, the metal hydroxide includes $Ni_xCo_yMn_zM_k(OH)_2$, where, $0.5 \le x < 1$, $0 \le y \le 0.5$, $0 \le z \le 0.5$, $0 \le k \le 0.1$, and M includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr. The above M element can be uniformly added as a dopant in the metal hydroxide.

Further, $0.55 \le x \le 0.95$, $0.025 \le y \le 0.25$, $0.01 \le z \le 0.2$. Further, x, y, and z may satisfy $0.6 \le x \le 0.92$, $0.03 \le y \le 0.2$, $0.015 \le z \le 0.195$. The molar percentage of the doping element M may fall within a range of $0 < k \le 0.04$, and specifically, may fall within a range of $0.005 \le k \le 0.035$.

In some embodiments, an average particle size $Dv_{50}$ of particles of the metal hydroxide satisfies: 1 μm≤$Dv_{50}$≤20 μm.

In some embodiments, the metal hydroxide includes a secondary particle formed by agglomerating primary particles. In some embodiments, a length-to-diameter ratio of the primary particles is 4 to 14. A method for measuring the length-to-diameter includes: selecting a plurality of primary particles randomly from an SEM image, determining a minimum-sized rectangle that can include the profile of the selected primary particles, and determining the length-to-diameter ratio based on a length-to-width ratio of the rectangle. When the length-to-diameter ratio of the primary particles falls within the above range, the metal hydroxide precursor is of relatively high uniformity, thereby improving the structural stability of the prepared positive electrode material. In some embodiments, a length-to-diameter ratio of the primary particles is 6 to 13.

This application further provides a method for preparing the metal hydroxide. The method includes the following steps: 1) making an aqueous solution react under an alkaline condition to obtain a solid-phase product, where the aqueous solution contains Ni element, optionally Co element, optionally Mn element, and optionally M element; and 2) performing heat treatment on the solid-phase product in an ozone atmosphere to obtain the metal hydroxide. The M element includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr.

In some embodiments, based on the total molar mass of the Ni element, Co element, Mn element, and M element, the molar percentage of the Ni element in the aqueous solution is greater than or equal to 50%.

In some embodiments, based on the total molar mass of the Ni element, Co element, Mn element, and M element, the molar percentage of the Co element in the aqueous solution is less than or equal to 50%.

In some embodiments, based on the total molar mass of the Ni element, Co element, Mn element, and M element, the molar percentage of the Mn element in the aqueous solution is less than or equal to 50%.

In some embodiments, based on the total molar mass of the Ni element, Co element, Mn element, and M element, the molar percentage of the M element in the aqueous solution is less than or equal to 10%.

In some embodiments, the aqueous solution includes ammonia water.

In some embodiments, the alkaline condition is that the pH of the aqueous solution is 10 to 12.

In some embodiments, step 1) includes: dissolving a salt of the Ni element, optionally a salt of the Co element, optionally a salt of the Mn element, and optionally a salt of the M element in an aqueous solution in which ammonia is dissolved, and adjusting the pH of the aqueous solution to 10 to 12 by using sodium hydroxide.

In some embodiments, the volume percentage of ozone in the ozone atmosphere is 1% to 10%.

According to a second aspect of this application, a positive electrode material is further provided. The positive electrode material includes a lithium-nickel composite oxide. An X-ray diffraction spectrum of the positive electrode material includes a first diffraction peak, a second diffraction peak, and a third diffraction peak distributed sequentially from a low angle to a high angle in a range of 34° to 39°, satisfying: 0.25≤(a peak intensity of the second diffraction peak+a peak intensity of the third diffraction peak)/a peak intensity of the first diffraction peak≤0.5. The second diffraction peak is a diffraction peak of the (006) crystal plane of the lithium-nickel composite oxide. The third diffraction peak is a diffraction peak of the (102) crystal plane of the lithium-nickel composite oxide. The first diffraction peak is a diffraction peak of the (101) crystal plane of the lithium-nickel composite oxide. By satisfying the above relationship, this application reduces empty lithium sites and Li/Ni disordering in the positive electrode material, and achieves both orderliness of the layered structure and high activity of lithiation, thereby improving the cycle performance and high-temperature performance of the electrochemical device.

In some embodiments, the X-ray diffraction spectrum of the positive electrode material includes a fourth diffraction peak in a range of 19° to 20° and a fifth diffraction peak in a range of 43° to 46°, satisfying: 1≤a peak intensity of the fourth diffraction peak/a peak intensity of the fifth diffraction peak≤1.5. The fourth diffraction peak is a diffraction peak of the (003) crystal plane of the lithium-nickel composite oxide. The fifth diffraction peak is a diffraction peak of the (104) crystal plane of the lithium-nickel composite oxide. The peak intensity ratio between the fourth diffraction peak and the fifth diffraction peak satisfies the above range, and therefore, both the ionic conductivity and electronical conductivity of the positive electrode material are improved, thereby facilitating exertion of the capacity of the positive electrode material and retention of the capacity during cycling, reducing polarization, and reducing the irreversible capacity of the battery.

In some embodiments, based on a mass of the positive electrode material, a mass percentage of residual lithium on a surface of the positive electrode material is m, satisfying: m≤0.5%. With the content of residual lithium falling within the above range, this application reduces the occurrence of side reactions on the surface, suppresses gas production, and in turn, improves the safety performance of the electrochemical device.

In some embodiments, based on a molar mass of a metal element except Li in the positive electrode material, a molar percentage of Ni element in the positive electrode material is greater than or equal to 50%. With the Ni element content falling within the above range, the positive electrode material achieves a relatively high discharge capacity per gram, thereby increasing the energy density of the electrochemical device. Specifically, in some embodiments, the molar percentage of the Ni element is greater than or equal to 50% and less than or equal to 95%.

In some embodiments, the positive electrode material further includes Co element. Based on the molar mass of the metal element except Li in the positive electrode material, a molar percentage of the Co element in the positive electrode material is less than or equal to 50%. Specifically, in some embodiments, the molar percentage of the Co element is greater than or equal to 1% and less than or equal to 25%.

In some embodiments, the positive electrode material further includes Mn element. Based on the molar mass of the metal element except Li in the positive electrode material, a molar percentage of the Mn element in the positive electrode material is less than or equal to 50%. Specifically, in some embodiments, the molar percentage of the Mn element is greater than or equal to 1% and less than or equal to 25%.

In some embodiments, the positive electrode material further includes an M element. The M element includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr. Based on the molar mass of the metal element except Li in the positive electrode material, a molar percentage of the M element in the positive electrode material is less than or equal to 10%. Specifically, in some embodiments, the molar percentage of the M element is greater than 0 and less than or equal to 5%.

In some embodiments, the positive electrode material includes $Li_mNi_xCo_yMn_zM_kO_{2+b}R_b$, where $0.2 \le m \le 1.2$, $0.5 \le x < 1$, $0 \le y \le 0.5$, $0 \le z \le 0.5$, $0 \le k \le 0.1$, and $0 \le b \le 0.1$. M includes at least one of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, or Pr. R includes at least one of P, F, or N.

According to a third aspect, an electrochemical device is provided, including a positive electrode. The positive electrode includes a positive active layer. The positive active layer includes the positive electrode material described above or a positive electrode material prepared from the metal hydroxide. The electrochemical device includes any device in which an electrochemical reaction occurs. Specific examples of the electrochemical device include all types of primary batteries or secondary batteries. In particular, the electrochemical device is a lithium battery, including a lithium metal battery, a lithium-ion battery, or a lithium-ion polymer battery.

In some embodiments, the positive active layer further includes a conductive agent and a binder. In some embodiments, the binder includes, but is not limited to: polyvinyl alcohol, hydroxypropyl cellulose, diacetyl cellulose, polyvinyl chloride, carboxylated polyvinyl chloride, polyvinylpyrrolidone, polyurethane, polytetrafluoroethylene, polyvinylidene difluoride, styrene-butadiene rubber, acrylated styrene-butadiene rubber, or the like. In some embodiments, the conductive agent includes, but is not limited to, a carbon-based material, a metal-based material, a conductive polymer, or a mixture thereof. In some embodiments, the carbon-based material is selected from graphite, carbon black, acetylene black, Ketjen black, carbon nanotubes, carbon fibers, graphene, or any combination thereof. In some embodiments, the metal-based material is selected from metal powder, metal fibers, copper, nickel, aluminum, or silver. In some embodiments, the conductive polymer is a polyphenylene derivative.

In some embodiments, the positive electrode further includes a positive current collector. The positive current collector may be a metal foil or a composite current collector. For example, the positive current collector may be an aluminum foil. The composite current collector may be formed by disposing a metal material (copper, copper alloy, nickel, nickel alloy, titanium, titanium alloy, silver, silver alloy, and the like) on a polymer substrate.

The electrochemical device according to this application further includes a negative electrode. The negative electrode includes a negative active layer and a negative current collector.

In some embodiments, the negative active layer includes a negative electrode material, a binder, and optionally a conductive agent. In some embodiments, the negative electrode material may include a material that allows reversible intercalation and deintercalation of lithium ions, lithium metal, lithium metal alloy, or transition metal oxide. In some embodiments, the negative electrode material includes at least one of a carbon material or a silicon material. The carbon material includes at least one of graphite or hard carbon. The silicon material includes at least one of silicon, a silicon-oxygen compound, a silicon-carbon compound, or silicon alloy. In some embodiments, the binder may include various binder polymers. In some embodiments, the binder includes at least one of polyvinylidene fluoride, poly(vinylidene fluoride-co-hexafluoropropylene), polyamide, polyacrylonitrile, polyacrylate, polyacrylic acid, polyacrylic acid sodium salt, sodium carboxymethyl cellulose, polyvinylpyrrolidone, polyvinyl ether, polytetrafluoroethylene, polyhexafluoropropylene, or styrene-butadiene rubber. In some embodiments, the conductive agent may be made of any conductive material so long as the material does not cause a chemical change. In some embodiments, the conductive agent includes at least one of conductive carbon black, acetylene black, carbon nanotubes, Ketjen black, carbon fibers, or graphene.

In some embodiments, the negative current collector may be a copper foil, a nickel foil, a stainless steel foil, a titanium foil, foamed nickel, foamed copper, a conductive-metal-clad polymer substrate, or any combination thereof.

The electrochemical device according to this application further includes an electrolytic solution. The electrolytic solution includes a lithium salt and a nonaqueous solvent.

In some embodiments, the lithium salt is at least one selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt may be $LiPF_6$.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the chain carbonate compound are dimethyl carbonate (DMC), diethyl carbonate (DEC), dipropyl carbonate (DPC), methyl propyl carbonate (MPC), ethylene propyl carbonate (EPC), ethyl methyl carbonate (EMC), or any combination thereof. Examples of the cyclic carbonate compound are ethylene carbonate (EC), propylene carbonate (PC), butylene carbonate (BC), vinyl ethylene carbonate (VEC), or any combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or any combination thereof.

Examples of the carboxylate compound are methyl formate, methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, or any combination thereof.

Examples of the ether compound are dibutyl ether, tetraglyme, diglyme, 1,2-dimethoxyethane, 1,2-diethoxyethane, ethoxy-methoxyethane, 2-methyltetrahydrofuran, tetrahydrofuran, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester and any combination thereof.

In some embodiments, the electrochemical device includes a separator disposed between the positive electrode and the negative electrode to prevent a short circuit. The material and the shape of the separator applicable to an embodiment of this application are not particularly limited, and may be based on any technology disclosed in the prior art. In some embodiments, the separator includes a polymer or an inorganic compound or the like formed from a material that is stable to the electrolytic solution disclosed in this application. For example, the separator may include a substrate layer and a surface treatment layer. The substrate layer is a non-woven fabric, film or composite film, each being of a porous structure. The material of the substrate layer includes at least one of polyethylene, polypropylene, polyethylene terephthalate, or polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film. The surface treatment layer is disposed on at least one surface of the substrate layer. The surface treatment layer may be a polymer layer or an inorganic compound layer, or a layer formed by mixing a polymer and an inorganic compound. The inorganic substance layer includes inorganic particles and a binder. The inorganic particles include at least one of aluminum oxide, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide, or barium sulfate. The binder includes at least one of polyvinylidene fluoride, vinylidene poly(fluoride-co-hexafluoropropylene), polyamide, polyacrylonitrile, polyacrylate, polyacrylic acid, polyacrylic acid sodium salt, polyvinylpyrrolidone, polyvinyl ether, polymethyl methacrylate, polytetrafluoroethylene, or polyhexafluoropropylene. The polymer layer includes a polymer. The material of the polymer includes at least one of polyamide, polyacrylonitrile, an acrylate polymer, polyacrylic acid, polyacrylic acid sodium salt, polyvinylpyrrolidone, polyvinyl ether, polyvinylidene fluoride, or poly(vinylidene fluoride-co-hexafluoropropylene).

According to a fourth aspect of this application, an electrical device is further provided, including the electrochemical device. The use of the electrochemical device is not particularly limited. The electrochemical device may be used for various well-known purposes, for example, may be for use in a notebook computer, desktop computer, tablet computer, e-book player, portable phone, portable fax machine, portable printer, stereo headset, video recorder, liquid crystal display television set, portable CD player, electronic notepad, calculator, memory card, radio, backup power supply, motor, automobile, motorcycle, power-assisted bicycle, lighting appliance, toy, electronic game console, watch, electric tool, camera, household battery, lithium-ion capacitor, and the like.

EMBODIMENTS AND COMPARATIVE EMBODIMENTS

Comparative Embodiment 1

Preparing Metal Hydroxide:

Pass nitrogen and argon beforehand into a reaction vessel containing a base liquid in which ammonia is dissolved, keep passing such gases into the solution for 60 minutes, weigh out a sulfate of nickel, cobalt, and manganese at a molar ratio of 0.92:0.03:0.05, and then dissolve the sulfate into the solution when controlling the total molar fraction of metal ions to be 2 mol/L. Adjust the pH in the reaction vessel to 12.75 by using a 4 mol/L sodium hydroxide solution, keep reacting for 20 hours, and then separate solid from liquid with a centrifuge after the reaction. Bake and sieve the product to remove iron, and finally obtain a metal hydroxide precursor.

Synthesizing the Positive Electrode Material:

Weigh out a lithium hydroxide salt and the metal hydroxide precursor at a molar ratio of 1.05:1 between Li and the metal element in the metal hydroxide. Mix the ingredients for 30 minutes by using a high-speed mixer. Lay the mixture flat in a saggar after the ingredients are mixed. Control the thickness of the mixture layer to fall between 0.8 cm and 2 cm. Sinter the mixture in a box-type oven at 700° C. for 12 hours in an oxygen atmosphere to obtain a calcined product. Cool down the calcined product, grind the product into powder, and sieve the powder to remove iron to obtain a positive electrode material.

Comparative Embodiment 2

Preparing Metal Hydroxide:

Pass nitrogen and argon beforehand into a reaction vessel containing a base liquid in which ammonia is dissolved, keep passing such gases into the solution for 60 minutes, weigh out a sulfate of nickel, cobalt, and manganese at a molar ratio of 0.82:0.12:0.06, and then dissolve the sulfate into the solution when controlling the total molar fraction of metal ions to be 2 mol/L. Adjust the pH in the reaction vessel to 11.25 by using a 4 mol/L sodium hydroxide solution, keep reacting for 20 hours, and then separate solid from liquid with a centrifuge after the reaction. Bake and sieve the product to remove iron, and finally obtain a metal hydroxide precursor.

Synthesizing the Positive Electrode Material:

Weigh out a lithium hydroxide salt and the metal hydroxide precursor at a molar ratio of 1.04:1 between Li and the metal element in the metal hydroxide. Mix the ingredients for 30 minutes by using a high-speed mixer. Lay the mixture flat in a saggar after the ingredients are mixed. Control the thickness of the mixture layer to fall between 0.8 cm and 2 cm. Sinter the mixture in a box-type oven at 800° C. for 12 hours in an oxygen atmosphere to obtain a calcined product. Cool down the calcined product, grind the product into powder, and sieve the powder to remove iron to obtain a positive electrode material.

Comparative Embodiment 3

Preparing Metal Hydroxide:

Pass nitrogen and argon beforehand into a reaction vessel containing a base liquid in which ammonia is dissolved, keep passing such gases into the solution for 60 minutes, weigh out a sulfate of nickel, cobalt, and manganese at a molar ratio of 0.6:0.2:0.2, and then dissolve the sulfate into the solution when controlling the total molar fraction of metal ions to be 2 mol/L. Adjust the pH in the reaction vessel to 11.00 by using a 4 mol/L sodium hydroxide solution, keep reacting for 20 hours, and then separate solid from liquid with a centrifuge after the reaction. Bake and sieve the product to remove iron, and finally obtain a metal hydroxide precursor.

Synthesizing the Positive Electrode Material:

Weigh out a lithium hydroxide salt and the metal hydroxide precursor at a molar ratio of 1.03:1 between Li and the metal element in the metal hydroxide. Mix the ingredients for 30 minutes by using a high-speed mixer. Lay the mixture flat in a saggar after the ingredients are mixed. Control the thickness of the mixture layer to fall between 0.8 cm and 2 cm. Sinter the mixture in a box-type oven at 860° C. for 12 hours in an oxygen atmosphere to obtain a calcined product. Cool down the calcined product, grind the product into powder, and sieve the powder to remove iron to obtain a positive electrode material.

Embodiment 1

Preparing Metal Hydroxide

Pass nitrogen and argon beforehand into a reaction vessel containing a base liquid in which ammonia is dissolved, keep passing such gases into the solution for 60 minutes, weigh out a sulfate of nickel, cobalt, and manganese at a molar ratio of 0.92:0.03:0.05, and then dissolve the sulfate into the solution when controlling the total molar fraction of metal ions to be 2 mol/L. Adjust the pH in the reaction vessel to 11.7 by using a 4 mol/L sodium hydroxide solution, keep reacting for 20 hours, and then separate solid from liquid with a centrifuge after the reaction. Pass 5 vol % ozone into the mixture during the baking. Sieve the mixture to remove iron after the baking, and finally obtain a metal hydroxide precursor.

Synthesizing the Positive Electrode Material:

Weigh out a lithium hydroxide salt and the metal hydroxide precursor at a molar ratio of 1.05:1 between Li and the metal element in the metal hydroxide. Mix the ingredients for 30 minutes by using a high-speed mixer. Lay the mixture flat in a saggar after the ingredients are mixed. Control the thickness of the mixture layer to fall between 0.8 cm and 2 cm. Sinter the mixture in a box-type oven at 700° C. for 12 hours in an oxygen atmosphere to obtain a calcined product. Cool down the calcined product, grind the product into powder, and sieve the powder to remove iron to obtain a positive electrode material.

Embodiments 2 to 18

The difference from Embodiment 1 is that the type, content, and corresponding preparation conditions of the metal elements in the step of preparing the metal hydroxide are adjusted, as shown in Table 1 in detail.

The specific process data and doping elements in each comparative embodiment and embodiment are shown in Table 1.

TABLE 1

Specific process data and doping elements in different embodiments and comparative embodiments

| | Example | | | | | | | | | | |
|---|---|---|---|---|---|---|---|---|---|---|---|
| | Ni | Co | Mn | Zr | Ti | Mg | Al | La | W | pH | Percentage of $O_3$ in baking |
| | Unit | | | | | | | | | | |
| | mol | mol | mol | mol | mol | mol | mol | mol | mol | / | vol % |
| Comparative Embodiment 1 | 0.92 | 0.03 | 0.05 | 0 | 0 | 0 | 0 | 0 | 0 | 11.75 | 0 |
| Comparative Embodiment 2 | 0.82 | 0.12 | 0.06 | 0 | 0 | 0 | 0 | 0 | 0 | 11.25 | 0 |
| Comparative Embodiment 3 | 0.6 | 0.2 | 0.2 | 0 | 0 | 0 | 0 | 0 | 0 | 11.00 | 0 |
| Embodiment 1 | 0.92 | 0.03 | 0.05 | 0 | 0 | 0 | 0 | 0 | 0 | 11.70 | 5 |
| Embodiment 2 | 0.92 | 0.03 | 0.045 | 0.005 | 0 | 0 | 0 | 0 | 0 | 11.70 | 5 |
| Embodiment 3 | 0.92 | 0.03 | 0.04 | 0.01 | 0 | 0 | 0 | 0 | 0 | 11.60 | 5 |
| Embodiment 4 | 0.92 | 0.03 | 0.035 | 0 | 0.01 | 0.005 | 0 | 0 | 0 | 11.50 | 5 |
| Embodiment 5 | 0.92 | 0.03 | 0.02 | 0.01 | 0.01 | 0.005 | 0 | 0.005 | 0 | 11.30 | 5 |
| Embodiment 6 | 0.92 | 0.03 | 0.015 | 0.01 | 0.01 | 0.005 | 0.005 | 0.005 | 0 | 11.00 | 5 |
| Embodiment 7 | 0.82 | 0.12 | 0.06 | 0 | 0 | 0 | 0 | 0 | 0 | 11.20 | 3 |
| Embodiment 8 | 0.82 | 0.12 | 0.055 | 0.005 | 0 | 0 | 0 | 0 | 0 | 11.20 | 3 |
| Embodiment 9 | 0.82 | 0.12 | 0.05 | 0.01 | 0 | 0 | 0 | 0 | 0 | 11.10 | 3 |
| Embodiment 10 | 0.82 | 0.12 | 0.045 | 0 | 0.01 | 0.005 | 0 | 0 | 0 | 11.05 | 3 |
| Embodiment 11 | 0.82 | 0.12 | 0.03 | 0.01 | 0.01 | 0.005 | 0 | 0.005 | 0 | 11.00 | 3 |
| Embodiment 12 | 0.82 | 0.12 | 0.025 | 0.01 | 0.01 | 0.005 | 0.005 | 0.005 | 0 | 10.90 | 3 |
| Embodiment 13 | 0.6 | 0.2 | 0.195 | 0.005 | 0 | 0 | 0 | 0 | 0 | 11.00 | 1 |
| Embodiment 14 | 0.6 | 0.2 | 0.195 | 0.005 | 0 | 0 | 0 | 0 | 0 | 11.00 | 1 |
| Embodiment 15 | 0.6 | 0.2 | 0.19 | 0.01 | 0 | 0 | 0 | 0 | 0 | 10.90 | 1 |
| Embodiment 16 | 0.6 | 0.2 | 0.185 | 0 | 0.01 | 0.005 | 0 | 0 | 0 | 10.80 | 1 |
| Embodiment 17 | 0.6 | 0.2 | 0.175 | 0.01 | 0.01 | 0.005 | 0 | 0 | 0 | 10.70 | 1 |
| Embodiment 18 | 0.6 | 0.2 | 0.16 | 0.01 | 0.01 | 0.005 | 0.005 | 0.005 | 0.005 | 10.65 | 1 |

Preparing a Positive Electrode Plate:

Mix a positive electrode material, conductive carbon black (super P) as a conductive agent, and polyvinylidene difluoride (PVDF) as a binder at a mass ratio of 98:1:1, add an appropriate amount of N-methyl-pyrrolidone (NMP for short) as a solvent, stir the mixture well to form a positive slurry with a solid content of 75%. Subsequently, coat one surface of an aluminum foil with the positive slurry evenly, and dry the aluminum foil at a temperature of 80° C. Repeat the foregoing step on the other surface of the aluminum foil to obtain a positive electrode plate coated on both sides. Perform cold pressing, cutting, and tab welding to obtain a positive electrode plate.

Preparing a Separator

Use a polyethylene (PE) porous polymer film as a separator.

Preparing a Negative Electrode Plate:

Stir and mix well artificial graphite as a negative electrode material, styrene-butadiene rubber as a binder, and sodium carboxymethyl cellulose (CMC for short) as a thickener in an appropriate amount of deionized water solvent at a mass ratio of 96:2:2 to form a homogeneous negative slurry. Coat one surface of a copper foil with the negative slurry, and dry the slurry. Repeat the foregoing step on the other surface of the copper foil to obtain a negative electrode plate coated on both sides. Perform cold pressing, cutting, and tab welding to obtain a negative electrode plate.

Preparing a Lithium-Ion Battery:

Stack the prepared positive electrode plate, separator, and negative electrode plate in sequence. Let the separator be located between the positive electrode plate and the negative electrode plate to serve a separation function, and then wind the stacked structure to obtain a bare cell. Put the bare cell into an aluminum plastic film package, and leave an injection port open. Inject the prepared electrolytic solution into the package through the injection port (the ingredients of the electrolytic solution are mixed at a mass ratio of 1:1:1 between EC, PC, and DEC, and the mass concentration of $LiPF_6$ in the electrolytic solution is 12.5%). Perform steps such as vacuum packaging, static standing, chemical formation, and shaping to complete preparing a lithium-ion battery.

Test Methods

XRD test: Keep a flat and neat surface of the metal hydroxide precursor powder/positive electrode material powder. Put the powder into a specimen holder of an XRD test instrument (model: Bruker-D8). Scan the specimen at a speed of 2°/min in a scan angle range of 10° to 90° to obtain an XRD diffraction pattern.

Testing the Particle Size:

Measure the average particle size $Dv_{50}$ of the metal hydroxide by using a laser particle size analyzer.

Capture an SEM image of the material powder and observe the image through an SEM scanning electron microscope. Select 10 particles randomly in the SEM image. Select 10 primary particles of each particle randomly. Determine a minimum-sized rectangle that can envelop the profile of the selected primary particles. Measure and calculate a length-to-width ratio of the minimum-sized rectangle that can envelop the profile of the selected primary particles. Average out 100 results of the measured values to obtain the length-to-diameter ratio of the primary particles. The SEM images of comparative embodiments and embodiments are shown in FIG. 1.

Testing the Raman spectrum: Put the metal hydroxide into a specimen holder of the Raman test instrument. Rectify peak positions by using a silicon wafer. Focus on the points on the metal hydroxide randomly at a long focal length of 10+. Find the strongest peak in a range of 500 $cm^{-1}$ to 530 $cm^{-1}$ and a range of 3550 $cm^{-1}$ to 3610 $cm^{-1}$ of Raman shift. Determine a ratio of the peak intensity in the range of 500 $cm^{-1}$ to 530 $cm^{-1}$ to the peak intensity in the range of 3550 $cm^{-1}$ to 3610 $cm^{-1}$. Focus on 10 points randomly, and record the average value of such points as a Raman peak intensity ratio $I_1/I_2$.

Testing the content of residual lithium: Titrate lithium carbonate and lithium hydroxide in the positive electrode material by using a hydrochloric acid standard solution by means of acid-base titration. Instrument model: 905 Titrando potentiometric titrator; reagent: 0.05 mol/L HCl solution.

Testing the high-temperature storage performance: Charge the lithium-ion battery at a constant current of 0.2 C at a temperature of 25° C. until a voltage of 4.35 V to make the lithium-ion battery fully charged (100% SOC), and then discharge the battery at a constant current of 0.2 C until a voltage of 2.8 V to make the lithium-ion battery fully discharged. Record the discharge capacity at this time as an initial capacity. Repeat the above charging process to make the lithium-ion battery fully charged (100% SOC), and store the lithium-ion battery in a 60° C. oven for 7 days. Afterward, repeat the above charging and discharging processes for 3 times at 25° C. by using a current of 0.2 C. Measure the discharge capacity of the lithium-ion battery in the $3^{rd}$-time discharging, and record the discharge capacity as a reversible capacity of the battery that has been stored. Capacity loss rate after 7 days of storage at 60° C.=(initial capacity−reversible capacity after storage)/initial capacity×100%.

Charge the lithium-ion battery at a constant current of 0.2 C at a temperature of 25° C. until a voltage of 4.35 V to make the lithium-ion battery fully charged (100% SOC), and then discharge the battery at a constant current of 0.2 C until a voltage of 2.8 V to make the lithium-ion battery fully discharged. Record the discharge capacity at this time as an initial capacity. Repeat the above charging process to make the lithium-ion battery fully charged (100% SOC). Measure the thickness of the lithium-ion battery at this time by using a micrometer, and record the thickness as $H_0$. Store the lithium-ion battery in an 85° C. oven for 1 day, and then cool down the battery to 25° C. Measure the thickness of the lithium-ion battery at this time by using the micrometer, and record the thickness as $H_1$. Thickness expansion rate of the battery stored at 85° C.=$(H_1-H_0)/H_0\times100\%$.

Testing the high-temperature cycle performance: Charge the battery at a constant current of 0.5 C at 45° C. until a voltage of 4.35 V, and then discharge the battery at a constant current of 1 C until a voltage of 2.8 V. Repeat the foregoing charging and discharging steps for 500 cycles, and then calculate a ratio of the discharge capacity in the 500th cycle to the initial discharge capacity, that is, a capacity retention rate of the battery under high-temperature cycling.

Testing the button battery: Clean the positive active layer on one side of the positive electrode plate by using N-methyl-pyrrolidone (NMP). Bake the positive electrode plate in an 85° C. vacuum environment for 2 hours. Die-cut the positive electrode plate into small discs of the size required for making a 2025 button battery. Stack foamed nickel, a lithium sheet, a separator, and a positive electrode disc sequentially and assemble such parts into a button battery. Inject 50 microliters of electrolytic solution into the button battery. The ingredients of the electrolytic solution are EC, PC, DEC mixed at a volume ratio of 1:1:1. The concentration of $LiPF_6$ in the electrolytic solution is 1.15 mol/L.

Charge and discharge the assembled button battery at a current of 0.2 C at a temperature of 25° C. with the cut-off voltage being 2.7 V to 4.3 V. Calculate the gram capacity of the battery as: gram capacity=discharge capacity/mass of positive electrode material.

The parameters and test results of comparative embodiments and embodiments are shown in Table 2.

TABLE 2

Parameters and test results of embodiments and comparative embodiments

| Example | Metal hydroxide | | | | | Positive electrode material | | | |
|---|---|---|---|---|---|---|---|---|---|
| | Lattice constant c | c − 0.363x | Raman peak intensity ratio $I_1/I_2$ | $I_1/I_2$ + 4.32 x | c/a ratio | Length-to-diameter ratio of primary particles | XRD peak intensity ratio $I_{(003)}/I_{(104)}$ | XRD peak intensity ratio $(I_{(006)} + I_{(102)})/I_{(101)}$ | Content of residual lithium |
| Unit | Å | | / | | / | / | / | / | wt % |
| Comparative Embodiment 1 | 4.834 | 4.50 | 2.13 | 6.10 | 1.650 | 20 | 0.90 | 0.60 | 0.80% |
| Comparative Embodiment 2 | 4.798 | 4.50 | 2.56 | 6.10 | 1.650 | 20 | 0.70 | 0.72 | 0.70% |
| Comparative Embodiment 3 | 4.718 | 4.50 | 3.51 | 6.10 | 1.650 | 20 | 0.70 | 0.73 | 0.60% |
| Embodiment 1 | 4.550 | 4.22 | 0.52 | 4.49 | 1.470 | 6 | 1.10 | 0.44 | 0.31% |
| Embodiment 2 | 4.584 | 4.25 | 0.53 | 4.50 | 1.482 | 6 | 1.10 | 0.44 | 0.30% |
| Embodiment 3 | 4.634 | 4.30 | 1.03 | 5.00 | 1.484 | 7 | 1.20 | 0.42 | 0.23% |
| Embodiment 4 | 4.684 | 4.35 | 1.53 | 5.50 | 1.485 | 9 | 1.20 | 0.40 | 0.20% |
| Embodiment 5 | 4.714 | 4.38 | 1.83 | 5.80 | 1.487 | 13 | 1.32 | 0.38 | 0.18% |
| Embodiment 6 | 4.724 | 4.39 | 1.93 | 5.90 | 1.488 | 13 | 1.33 | 0.35 | 0.16% |
| Embodiment 7 | 4.508 | 4.21 | 0.86 | 4.40 | 1.480 | 6 | 1.14 | 0.39 | 0.22% |
| Embodiment 8 | 4.548 | 4.25 | 0.96 | 4.50 | 1.481 | 6 | 1.20 | 0.39 | 0.20% |
| Embodiment 9 | 4.598 | 4.30 | 1.46 | 5.00 | 1.483 | 7 | 1.30 | 0.37 | 0.13% |
| Embodiment 10 | 4.648 | 4.35 | 1.96 | 5.50 | 1.484 | 9 | 1.30 | 0.35 | 0.10% |
| Embodiment 11 | 4.678 | 4.38 | 2.26 | 5.80 | 1.485 | 14 | 1.42 | 0.33 | 0.08% |
| Embodiment 12 | 4.688 | 4.39 | 2.36 | 5.90 | 1.487 | 13 | 1.43 | 0.30 | 0.06% |
| Embodiment 13 | 4.4278 | 4.21 | 1.81 | 4.40 | 1.480 | 6 | 1.23 | 0.34 | 0.17% |
| Embodiment 14 | 4.468 | 4.25 | 1.91 | 4.50 | 1.481 | 6 | 1.30 | 0.34 | 0.15% |
| Embodiment 15 | 4.518 | 4.30 | 2.41 | 5.00 | 1.481 | 7 | 1.35 | 0.32 | 0.12% |
| Embodiment 16 | 4.568 | 4.35 | 2.91 | 5.50 | 1.483 | 9 | 1.35 | 0.30 | 0.10% |
| Embodiment 17 | 4.598 | 4.38 | 3.21 | 5.80 | 1.484 | 13 | 1.40 | 0.28 | 0.09% |
| Embodiment 18 | 4.608 | 4.39 | 3.31 | 5.90 | 1.485 | 13 | 1.40 | 0.25 | 0.05% |

The performance data of the lithium-ion batteries in each comparative embodiment and each embodiment is shown in Table 3.

TABLE 3

Performance data of the lithium-ion batteries in embodiments and comparative embodiments

| Example | Capacity loss rate after 7 days of storage at 60° C. | Gram capacity | Thickness expansion rate of battery stored at 85° C. for 1 day | 500th-cycle capacity retention rate of battery cycled at 45° C. |
|---|---|---|---|---|
| Unit | / | mAh/g | / | / |
| Comparative Embodiment 1 | 8.0% | 210.00 | 30.50% | 70.00% |
| Comparative Embodiment 2 | 4.0% | 199.00 | 18.94% | 75.00% |
| Comparative Embodiment 3 | 3.0% | 175.00 | 12.20% | 80.00% |
| Embodiment 1 | 1.4% | 214.00 | 5.50% | 83.00% |
| Embodiment 2 | 1.3% | 215.00 | 5.00% | 84.00% |
| Embodiment 3 | 1.2% | 216.00 | 5.00% | 85.00% |
| Embodiment 4 | 1.2% | 220.00 | 4.00% | 90.00% |
| Embodiment 5 | 1.1% | 219.00 | 4.40% | 89.00% |
| Embodiment 6 | 1.0% | 219.00 | 4.80% | 88.00% |

TABLE 3-continued

Performance data of the lithium-ion batteries in embodiments and comparative embodiments

| Example Unit | Capacity loss rate after 7 days of storage at 60° C. / | Gram capacity mAh/g | Thickness expansion rate of battery stored at 85° C. for 1 day / | 500th-cycle capacity retention rate of battery cycled at 45° C. / |
|---|---|---|---|---|
| Embodiment 7 | 0.7% | 200.00 | 2.70% | 92.30% |
| Embodiment 8 | 0.7% | 201.00 | 2.50% | 92.40% |
| Embodiment 9 | 0.6% | 203.00 | 2.50% | 93.50% |
| Embodiment 10 | 0.6% | 205.00 | 2.00% | 99.00% |
| Embodiment 11 | 0.6% | 204.00 | 2.20% | 97.90% |
| Embodiment 12 | 0.5% | 203.00 | 2.40% | 96.80% |
| Embodiment 13 | 0.5% | 176.00 | 1.55% | 92.20% |
| Embodiment 14 | 0.4% | 177.00 | 1.25% | 92.50% |
| Embodiment 15 | 0.4% | 179.00 | 1.25% | 93.60% |
| Embodiment 16 | 0.4% | 180.00 | 1.00% | 99.10% |
| Embodiment 17 | 0.4% | 184.00 | 1.10% | 98.00% |
| Embodiment 18 | 0.3% | 181.00 | 1.20% | 96.90% |

As can be learned from analysis of the data in Table 1 and Table 2, (1): Comparative Embodiment 1 versus Embodiment 1 shows that the axial lattice constant c of the material and the length-to-diameter ratio of the primary particles have changed on the basis of the preparation method according to an embodiment of this application. That is because the sintering in the preparation process is performed by using ozone that is highly oxidizing, and the average valence of nickel in the transition metal is increased, thereby increasing the valence of the transition metal and affecting the c-axis lattice constant. (2) Further, the process in some embodiments of this application affects the crystallographic orientation of the metal hydroxide precursor, improves the length-to-diameter ratio of the primary particles, and increases uniformity. (3) As can be seen from Embodiments 2 to 6, when the hydroxide is doped with the doping elements such as Zr, Ti, Mg, Al, La, and the like, the lattice constant of the layered structure can be changed.

With the metal hydroxide precursor satisfying $0.363x+4.2 \leq c \leq 0.363x+4.4$, the XRD peak intensity ratio of the positive electrode materials according to Embodiments 1 to 18 can satisfy $0.25 \leq (I_{(006)}+I_{(102)})/I_{(101)} \leq 0.5$, and the corresponding lithium-ion battery exhibits a lower capacity loss rate after high-temperature storage, a lower thickness expansion rate, and a higher capacity retention rate after high-temperature cycling. Reasons for such effects lie in two aspects. On the one hand, the c-axis lattice constant of the metal hydroxide precursor falls within the above range, thereby facilitating intercalation of lithium ions during preparation of the positive electrode material, reducing the content of residual lithium on the surface of the positive electrode material, and in turn, reducing occurrence of side reactions on the surface, suppressing gas production, and enhancing safety performance of the electrochemical device. On the other hand, the metal hydroxide precursor that falls within such a range incurs a relatively small amount of lattice defects and stacking faults, thereby enhancing the lithiation capability during sintering, and suppressing the formation of bulk-phase empty lithium sites and occurrence of Li/Ni disordering during the sintering of the positive electrode material. This further improves the orderliness of the layered structure and the lithiation activity of the positive electrode material, and in turn, improves the high-temperature cycle performance and storage performance of the lithium-ion battery.

What is described above is merely some exemplary embodiments of this application, and does not hereby limit the patent scope of this application in any way. All equivalent structural variations made by using the content of the specification and the drawings of this application, and direct or indirect use of the technical solutions hereof in other related technical fields without departing from the conception of this application, still fall within the patent protection scope of this application.

What is claimed is:

1. A positive electrode material, wherein the positive electrode material comprises a lithium-nickel composite oxide, and an X-ray diffraction spectrum of the positive electrode material comprises a first diffraction peak, a second diffraction peak, and a third diffraction peak distributed sequentially from a low angle to a high angle in a range of 34° to 39°, and 0.25≤(a peak intensity of the second diffraction peak+a peak intensity of the third diffraction peak)/a peak intensity of the first diffraction peak≤0.5.

2. The positive electrode material according to claim 1, wherein the X-ray diffraction spectrum of the positive electrode material comprises a fourth diffraction peak in a range of 19° to 20° and a fifth diffraction peak in a range of 43° to 46°, and 1≤a peak intensity of the fourth diffraction peak/a peak intensity of the fifth diffraction peak≤1.5.

3. The positive electrode material according to claim 1, wherein, based on a mass of the positive electrode material, a mass percentage of residual lithium on a surface of the positive electrode material is m, m≤0.5%.

4. The positive electrode material according to claim 1, wherein, based on a molar mass of metal elements except Li in the positive electrode material, a molar percentage of Ni element in the positive electrode material is greater than or equal to 50%.

5. The positive electrode material according to claim 1, wherein the positive electrode material further comprises Co element; and, based on the molar mass of the metal elements except Li in the positive electrode material, a molar percentage of the Co element in the positive electrode material is less than or equal to 50%.

6. The positive electrode material according to claim 1, wherein the positive electrode material further comprises Mn element; and, based on the molar mass of the metal elements except Li in the positive electrode material, a molar percentage of the Mn element in the positive electrode material is less than or equal to 50%.

7. The positive electrode material according to claim 1, wherein the positive electrode material further comprises an M element; the M element comprises at least one selected from the group consisting of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, and Pr; and, based on the molar mass of the metal elements except Li in the positive electrode material, a molar percentage of the M element in the positive electrode material is less than or equal to 10%.

8. The positive electrode material according to claim 1, wherein the positive electrode material comprises $Li_mNi_xCo_yMn_zM_kO_{2\pm b}R_b$, wherein $0.2 \le m \le 1.2$, $0.5 \le x < 1$, $0 \le y \le 0.5$, $0 \le z \le 0.5$, $0 \le k \le 0.1$, and $0 \le b \le 0.1$; M comprises at least one selected from the group consisting of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, and Pr; and R comprises at least one selected from the group consisting of P, F, and N.

9. An electrochemical device, comprising a positive electrode, wherein the positive electrode comprises a positive electrode material, wherein the positive electrode material comprises a lithium-nickel composite oxide; and an X-ray diffraction spectrum of the positive electrode material comprises a first diffraction peak, a second diffraction peak, and a third diffraction peak distributed sequentially from a low angle to a high angle in a range of 34° to 39°; and 0.25≤(a peak intensity of the second diffraction peak+a peak intensity of the third diffraction peak)/a peak intensity of the first diffraction peak≤0.5.

10. The electrochemical device according to claim 9, wherein the X-ray diffraction spectrum of the positive electrode material comprises a fourth diffraction peak in a range of 19° to 20° and a fifth diffraction peak in a range of 43° to 46°, and 1≤a peak intensity of the fourth diffraction peak/a peak intensity of the fifth diffraction peak≤1.5.

11. The electrochemical device according to claim 9, wherein, based on a mass of the positive electrode material, a mass percentage of residual lithium on a surface of the positive electrode material is m, m≤0.5%.

12. The electrochemical device according to claim 9, wherein, based on a molar mass of metal elements except Li in the positive electrode material, a molar percentage of Ni element in the positive electrode material is greater than or equal to 50%.

13. The electrochemical device according to claim 9, wherein the positive electrode material further comprises Co element; and, based on the molar mass of the metal elements except Li in the positive electrode material, a molar percentage of the Co element in the positive electrode material is less than or equal to 50%.

14. The electrochemical device according to claim 9, wherein the positive electrode material further comprises Mn element; and, based on the molar mass of the metal element except Li in the positive electrode material, a molar percentage of the Mn element in the positive electrode material is less than or equal to 50%.

15. The electrochemical device according to claim 9, wherein the positive electrode material further comprises an M element; the M element comprises at least one selected from the group consisting of Na, K, Sr, Ca, Al, Zr, Ti, W, Mg, Sn, Cu, Zn, Fe, Y, Mo, In, Pb, Sb, La, Ce, Yb, Sm, Gd, Sc, Cr, Ga, Ge, Ag, V, Nb, Ba, Ta, Hf, and Pr; and, based on the molar mass of the metal element except Li in the positive electrode material, a molar percentage of the M element in the positive electrode material is less than or equal to 10%.

* * * * *